March 21, 1933.   H. D. GARRETSON   1,902,227

HIGH POTENTIAL CURRENT UNIDIRECTIONAL SYSTEM AND METHOD

Filed Sept. 20, 1928

INVENTOR
HARRY D. GARRETSON
BY
ATTORNEY

Patented Mar. 21, 1933

1,902,227

UNITED STATES PATENT OFFICE

HARRY D. GARRETSON, OF NEW YORK, N. Y., ASSIGNOR TO HARRY F. WAITE, OF NEW YORK, N. Y.

HIGH POTENTIAL CURRENT UNIDIRECTIONAL SYSTEM AND METHOD

Application filed September 20, 1928. Serial No. 307,113.

The object of my invention is to provide a system of this class with a simple, reliable, durable and compact apparatus which may be employed wherever a high potential is needed as in X-ray work. This object is accomplished by my invention, one embodiment of which is hereinafter more particularly set forth.

Figure 1:
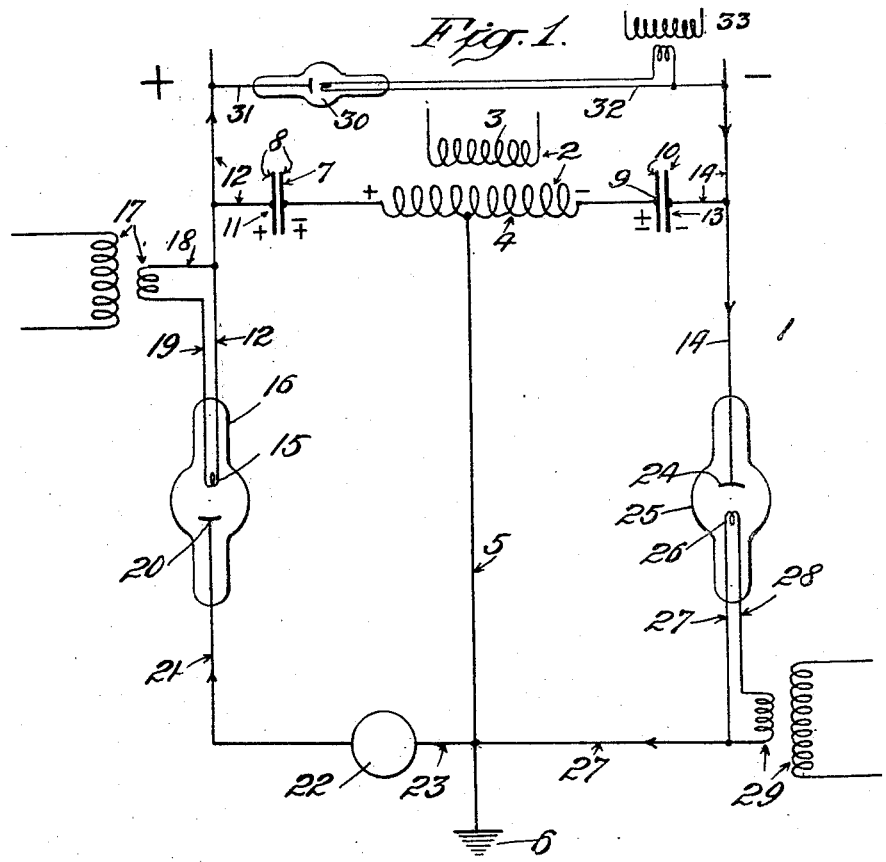

For a more detailed description of my invention, reference is to be had to the accompanying drawing, forming a part hereof, in which Figure 1 is a diagram of one embodiment of my invention.

Figure 2:
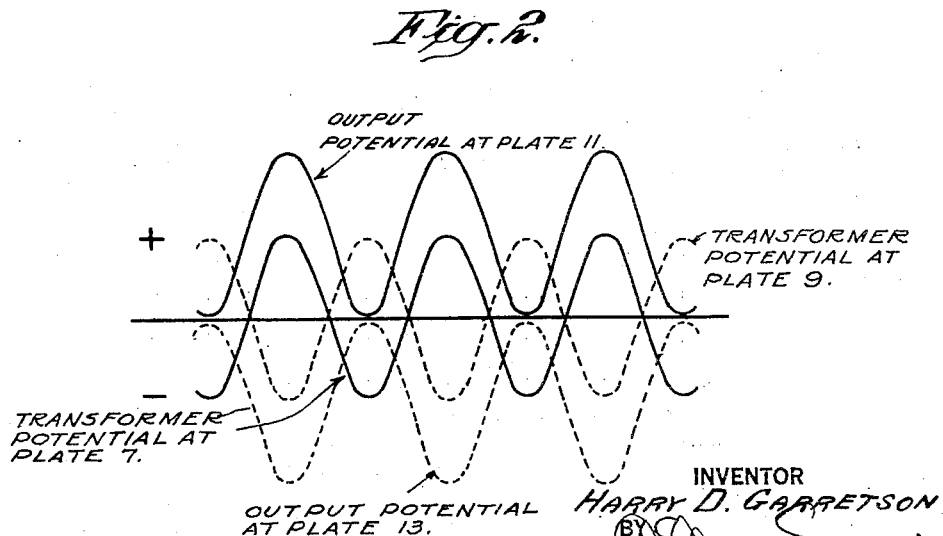

Figure 2 shows the relationship between the input and output characteristic, potential curves.

My improved system 1 has a step-up transformer 2 with its primary 3 connected to any suitable source of power and its secondary 4 grounded at its center or neutral point by a wire 5 which runs to the ground 6. One pole of the secondary 4 is connected to a plate 7 of a condenser 8 and the other pole to a plate 9 of a condenser 10. The condenser 8 has a second plate 11 which is connected to a wire 12 and the condenser 10 has a second plate 13 which is connected to a wire 14. The wires 12 and 14 are the high potential output wires of the system and may be connected to an X-ray tube or other suitable apparatus.

The wire 12 is also connected to the cathode 15 of a high potential hot cathode valve tube, such as a kenotron tube 16, and this hot cathode is supplied with a heating current through a step-down transformer 17 and the wires 18 and 19, and in the conventional manner. The anode 20 of this tube 16 is connected by a wire 21 with a meter 22 which has a wire 23 running to the ground wire 5.

In a similar manner, the wire 14 runs to the anode 24 of a kenotron tube 25 which has its hot cathode 26 connected by wires 27 and 28 to the secondary of a step-down transformer 29 which functions normally, and the wire 27 is also connected to the wire 5.

For illustrative purposes an X-ray tube 30 of the conventional hot cathode type is shown with connections 31 and 32 which run from the wire 12 to the wire 14, the former to the anode and the latter to the cathode. The connections 32 include a current supplying means 33 for the hot cathode.

In view of the foregoing, the operation of my improved system will be readily understood. Assuming that a power current enters the primary 3 in the transformer 2, in the conventional manner, a corresponding secondary current is induced in the secondary 4 which has say a potential of 100,000 volts. This will first be described on the assumption that the charge at the left end of this secondary 4 is negative and the right end is positive. At this time the valve tubes permit a flow of current in the direction shown by the arrows. Then condenser plates 11 and 13 are both at ground potential.

Now assume that the transformer has reversed its potential so that condenser plates 7 and 9 are positive and negative respectively. This is a change from 50,000 volts negative to 50,000 volts positive for plate 7 and from 50,000 volts positive to 50,000 volts negative for plate 9. This is a change of 100,000 volts on each plate. The opposing plates 11 and 13 experience a corresponding change by electrostatic inductions, that is, plate 11 which was at ground or zero potential now becomes 100,000 volts positive potential and plate 13 becomes 100,000 volts negative potential. Therefore, as these opposite charges occur they find an immediate outlet through the tube 30 and thereby cause it to function, the circuit being from the plate 11 to the wire 12 thence through the wire 31, tube 30, wires 32, wire 14 to plate 13. This cycle of operation is indefinitely repeated in the functioning of the apparatus, the potential of the positive side never falling below zero and rising to twice the positive potential of the step-up transformer. It is understood that the negative side has a corresponding wave which never rises above the neutral line, but it is not necessary to show this as it is necessarily implied.

In the foregoing description, no drop in potential has been mentioned or referred to. Of course, when a current is drawn from a system there is a slight drop which will depend on the capacity of the condensers and the resistance encountered. In practice, this drop has been found to be something like ten percent, when large condensers are employed with ordinary conductors. The voltages above expressed are correct when no current is passed through an X-ray tube or other device for which the system is adapted.

The characteristics of my invention may be briefly summarized as follows:

(1) The output is in the form of half wave impulses.

(2) A step-up transformer is required developing one quarter of the total voltage above the ground or zero voltage.

(3) Each condenser withstands only one quarter of the total voltage.

(4) Each valve tube withstands only one-half the total voltage.

(5) A direct current meter can measure the current at a grounded neutral point.

(6) The hot cathode of each valve tube is heated only enough for passing a current on approximately a half wave.

While I have shown and described one embodiment of my invention, it is obvious that it is not restricted thereto, but that it is broad enough to cover all embodiments that come within the scope of the annexed claims.

What I claim is:

1. The method of generating a high potential, unidirectional, pulsating current which consists in simultaneously generating a first high potential between two terminals, said potential charging a condenser at each terminal to a fixed potential then reversing said high potential to add to said condenser potentials whereby upon discharge a current passes in one direction only from the condensers, said current being passed at a higher potential than said first high potential.

2. An apparatus for generating a high potential, uni-directional current composed of a step-up transformer having a grounded wire at the neutral point of its secondary, condensers, one plate of each condenser being connected to opposite terminals of the secondary of the step-up transformer, high potential, hot cathode, valve tubes connecting the other plates of said condensers with the neutral wire, the said valves being connected electrically in series to permit the flow of a current in one direction only, and means through which the current may be passed when above zero potential.

3. An apparatus for generating a high potential, uni-directional current composed of a step-up transformer having a grounded wire at the neutral point of its secondary, condensers, one plate of each condenser being connected to opposite terminals of the secondary of the step-up transformer, high potential, hot cathode, valve tubes connecting the other plates of said condensers with the neutral wire, said valves being connected electrically in series to permit a flow of current in one direction only, a meter in circuit with said valves at the neutral point between them and means through which a current may be passed when the system is above zero potential.

4. An apparatus for generating a high potential, uni-directional current composed of a step-up transformer, condensers, one plate of each condenser being connected to opposite terminals of the secondary of the step-up transformer, and high potential, hot cathode, valve tubes connecting the other plates of said condensers, the said valves being connected in electrical series to permit the flow of a current in one direction only and means through which the current may be passed when above zero potential.

In testimony whereof, I have hereunto set my hand this 18th day of September, 1928.

HARRY D. GARRETSON.